Sept. 15, 1959    C. H. BRUNS ET AL    2,904,004
HEATED LIVESTOCK FOUNTAIN
Filed Sept. 4, 1957    2 Sheets-Sheet 1
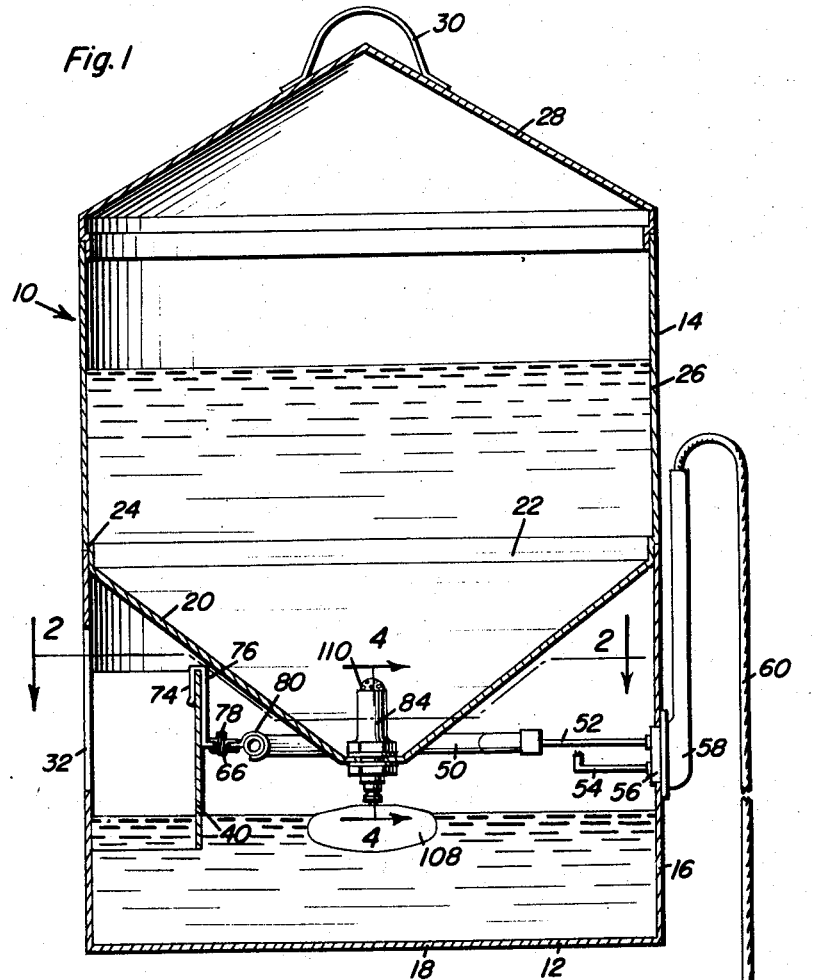
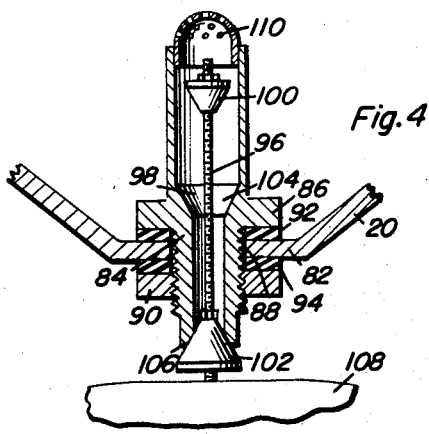
Cecil H. Bruns
Anton C. Bruns
INVENTORS Sept. 15, 1959   C. H. BRUNS ET AL   2,904,004
HEATED LIVESTOCK FOUNTAIN
Filed Sept. 4, 1957   2 Sheets-Sheet 2
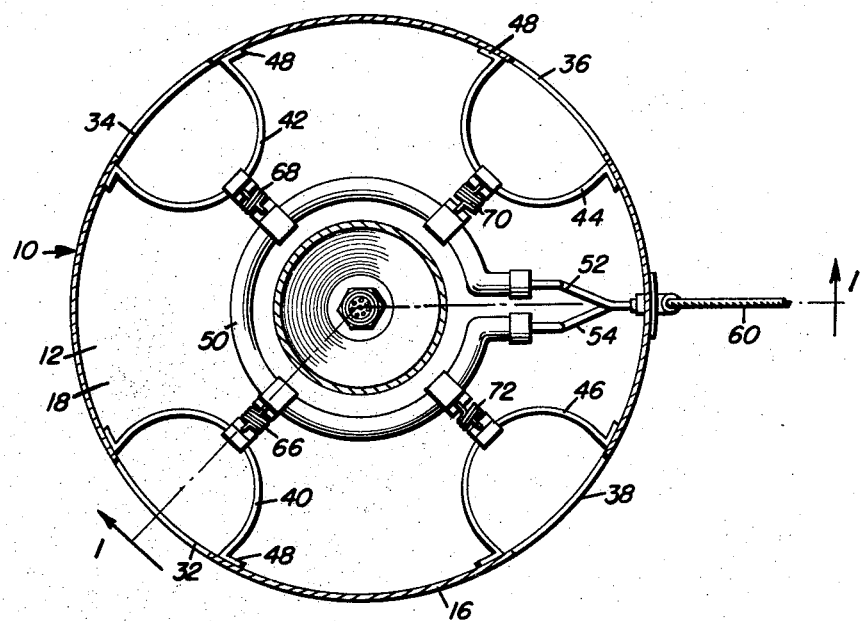
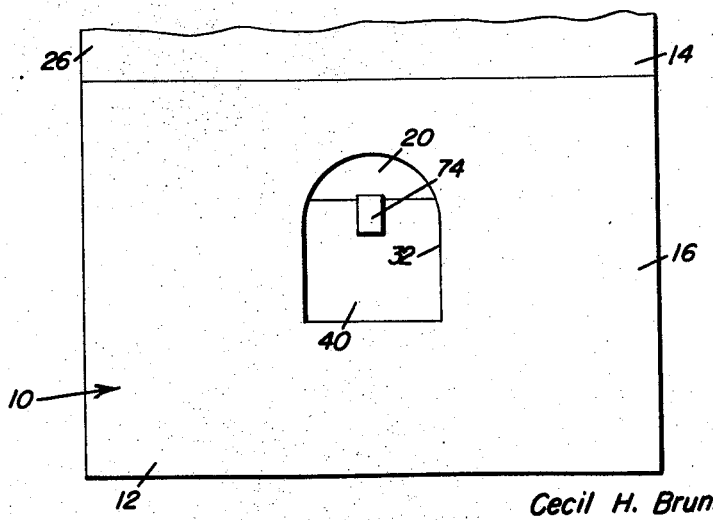
Cecil H. Bruns
Anton C. Bruns
INVENTORS United States Patent Office 2,904,004
Patented Sept. 15, 1959

2,904,004

HEATED LIVESTOCK FOUNTAIN

Cecil H. Bruns, Janesville, and Anton C. Bruns, Waverly, Iowa

Application September 4, 1957, Serial No. 682,029

8 Claims. (Cl. 119—73)

This invention relates to a fountain for watering animals and poultry and more particularly to a fountain which is designed especially for the purpose of weaning small pigs but which may be used to advantage for poultry.

An object of the invention is to provide a practical fountain which has a controlled water temperature, controlled access to the water, and is built in such a way as to provide for easy access in cleaning. Therefore, the invention makes provision for an extremely practical animal or poultry watering fountain of what we believe to be a unique design.

A further object of the invention is to provide a water fountain which has a tank in which a control of the water level is obtained, there being another container in which to store a supply of water and a float valve by which the container admits water to the tank up to a preselected level. The invention has a heating element interposed between the water level in the tank and the bottom of the container so that the water above and the water below the heating element is heated by radiation and convection currents.

One of the important features of the invention is the group of cupped headers that are aligned with the animal and poultry drinking openings in order to control the drinking and help to keep the water clean, these headers also functioning to support the heating element located within the tank.

Other objects and features of importance such as the simplicity and practicability of the invention will become apparent in following the description of the illustrated form of the invention.

In the drawings:

Figure 1 is a sectional view of a fountain constructed in accordance with the invention;

Figure 2 is a sectional view taken approximately on the line 2—2 of Figure 1;

Figure 3 is a fragmentary elevational view of the fountain; and

Figure 4 is an enlarged sectional view taken on the line 4—4 of Figure 1 and showing the valve and strainer arranged to control water flow from the container to the tank.

In the accompanying drawings there is a livestock fountain which is constructed in accordance with the invention. The fountain is made of a lower tank 12 and an upper container 14, the tank 12 having preferably a cylindrical side wall 16 and a bottom 18. The top of the tank 12 is open so that the bottom wall 20 of the container 14 may seat in it. Wall 20 is in the shape of a truncated cone and has a shallow cylindrical band 22 at its upper end which seats within the upper edge of side wall 16. Shoulder 24 is at the upper extremity of the cylindrical band 22 and seats on the upper edge of the tank side wall 16. If side wall 16 of tank 12 is cylindrical, it is suggested that side wall 26 of container 14 be similarly shaped. The upper end of the container 14 is open in order to fill the container with water.

Cover or lid 28 having a handle 30 is seated on the upper open end of container 14.

There are a plurality, preferably four, entrances formed by openings 32, 34, 36 and 38, respectively, in the side wall 16 of tank 12. These are drinking openings for animals or poultry. Semi-cylindrical headers 40, 42, 44, and 46, respectively, are attached to the inner surfaces of the side wall 16 by flanges 48 on each of the headers. They extend into the tank 12 a considerable distance (Figure 1) assuring that the water level is high enough so that the bottom edges of the headers are submerged. The purposes of the headers are to control drinking, help to maintain the water in tank 12 in a cleanly condition and to serve as a support for the heating element 50. This element is circular and has electrical conductors 52 and 54 extending from it and connected with a socket 56 in the side wall 16 of the tank. Plug 58 is adapted to connect with socket 56. Line cord 60 extends from plug 58 and has a male plug 62 at its opposite ends schematically representing a means by which to connect to an available source of electrical potential.

There are four assemblies 66, 68, 70 and 72, respectively, each consisting of two brackets and a spring which mount the heating element 50 centrally within tank 12. The bracket 74 of assembly 66 typifies all other corresponding brackets and consists of a hook 76 fitted over the top edge of header 40 and having an angulated end to which spring 78 is secured. The opposite end of the spring is attached to bracket 80 which is essentially in the form of an I embracing the circular heating element 50. By mounting in this manner, heating element 50 is capable of being located close to the bottom wall 20 of container 14 and above the level of liquid in tank 12.

The lowermost part 82 of wall 20 is approximately horizontal and has a valve body 84 passed through a hole 88 in it. The valve body has an upper flange 86 and a nut 90 thereon, the flange and nut bearing against washers 92 and 94 to assure that there will be no leakage after attaching the valve body in place. Valve stem 96 is reciprocatively disposed in the valve chamber 98 and closed by valve body 84, and it has two valve elements 100 and 102 thereon. Both of them are threaded on the valve stem 96 so that they may be adjusted with respect to each other, and they are adapted to seat on the two valve seats 104 and 106, respectively, which are formed at the upper and lower parts of the valve chamber 98. Therefore the valve is double acting. It is closed by gravity, as when container 14 is lifted from the tank 12, and it is also closed by elevation of the float 108 that is attached to the lower extremity of valve stem 96, and that is to sense the liquid level in tank 12. Strainer 110 is attached at the upper open end of the valve body 84 to assure that the water passing into the tank 10 will not contain any large foreign objects or particles.

In use, the tank is filled with water to the proper height, or the container 14 is filled and placed on the open upper end of the tank 12. When filling container 14 at a position remote from the tank 12 or when lifting the container from the tank for any other reason, as for cleaning the tank, the float 108 will pull the valve stem 96 (by gravity) to such position that the valve element 100 will close the valve by coming to rest on seat 98. Should the water level in tank 10 become low, the float 108 will lower the valve element 102 which is normally disposed on seat 106, admitting water from the container 14 into tank 12 until the proper level is reached, at which time valve 102 will come to rest on seat 106.

The heating element 50 is electrically energized to become heated. When the container is disposed on tank 12, the lower end of the container is disposed within the area enclosed by the circular heating element 50 (Figure 1), and the water at the lower part of container 14 and in tank 12 is maintained at the correct elevated temperature.

Drinking by the animals or poultry is through openings 32, 34, and 36 in the ordinary and expected way.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope to the invention as claimed.

What is claimed as new is as follows:

1. A drinking fountain for animals and poultry, said drinking fountain comprising a tank that has a side wall and an open upper end, a container having a tapered bottom wall, said container being removably seated on said tank with said tapered bottom wall projecting into said tank, a heating element disposed in said tank and located around the exterior surface of a part of said bottom wall of said container to heat the liquid in said container and in said tank simultaneously without contact with the liquid in either, said tank having at least one opening through which drinking may take place, a header attached to said tank and located between said tank side wall and said tapered bottom wall, and resilient means attached to said header for supporting said heating element within said tank between said tank side wall and said tapered wall.

2. A drinking fountain for animals and poultry, said drinking fountain comprising a tank that has an open upper end, a container having a tapered bottom wall, said container being removably seated on said tank with said tapered bottom wall projecting into said tank, a heating element disposed in said tank and located around a part of said bottom wall of said container to heat the liquid in said container and in said tank simultaneously without contact with the liquid in either, said tank having a plurality of openings, through which drinking may take place, a plurality of headers, one being arranged around each of said openings and carried by said tank, resilient means attached to said headers for supporting said heating element within said tank, the lower part of said container wall having an opening, a valve body disposed in said opening, an adjustable double acting valve in said valve body, a float operatively connected with said double acting valve to operate the same and adapted to sense the liquid level in said tank for operating said double acting valve.

3. The fountain of claim 2 wherein said container wall is in the form of a truncated cone, a band at the upper extremity thereof which seats against the inside surface of the upper end of said tank, a laterally projecting shoulder at the upper extremity of said band which seats upon the outer edge of the upper open end of said tank, said shoulder projecting laterally a sufficient distance for the outer peripheral surface of said container to be coplanar with the outer peripheral surfaces of said tank whereby said fountain has the appearance of being integral.

4. In an animal and poultry fountain, the combination of an upper container and a lower tank, said upper container being removably disposed on said tank, a water passage intercommunicating said container with said tank, a float valve in said tank and container to control the flow of liquid from said container and through said passage into said tank, said tank having openings through which the animals or poultry may drink, and headers attached to said tank and arranged around said openings on the inside of said tank to control drinking, a heating element disposed in said tank at a place above the float of said float valve, and means supporting said heater on said headers and in spaced relationship to the liquid in said tank and container.

5. The combination of claim 4 wherein said heating element supporting means includes springs and a pair of hooks attached to said headers and said heating element respectively.

6. A drinking fountain for animals and poultry, said drinking fountain comprising a tank that has an open upper end, a container having a tapered bottom wall, said container being removably seated on said tank with said tapered bottom wall projecting into said tank, a heating element disposed in said tank and located around a part of said bottom wall of said container to heat the liquid in said container and in said tank simultaneously without contact with the liquid in either, said tank having a plurality of openings through which drinking may take place, a plurality of headers, one being arranged around each of said openings, and carried by said tank, resilient means attached to said headers for supporting said heating element within said tank, the lower part of said container wall having an opening, a valve body disposed in said opening, an adjustable double acting valve in said valve float operatively connected with said double acting valve to operate the same and adapted to sense the liquid level in said tank for operating said double acting valve, first and second gaskets encircling said opening on the upper and lower surfaces respectively, a flange projecting from said valve body and seated upon said first gasket, the portion of the valve body disposed through an below said opening being threaded, a nut threaded on said portion and in engagement with said second gasket.

7. A drinking fountain for animals and poultry, said drinking fountain comprising a tank that has an open upper end, a container having a tapered bottom wall, said container being removably seated on said tank with said tapered bottom wall projecting into said tank, a heating element disposed in said tank and located around a part of said bottom wall of said container to heat the liquid in said container and in said tank simultaneously without contact with the liquid in either, said tank having a plurality of openings through which drinking may take place, a plurality of headers, one being arranged around each of said openings and carried by said tank, resilient means attached to said headers for supporting said heating element within said tank, the lower part of said container wall having an opening, a valve body disposed in said opening, an adjustable double acting valve in said valve body, a float operatively connected with said double acting valve to operate the same and adapted to sense the liquid level in said tank for operating said double acting valve, said valve having two valve heads which are adjustable toward and away from each other.

8. A drinking fountain for animals and poultry, said drinking fountain comprising a tank that has an open upper end, a container having a tapered bottom wall, said container being removably seated on said tank with said tapered bottom wall projecting into said tank, a heating element disposed in said tank and located around a part of said bottom wall of said container to heat the liquid in said container and in said tank simultaneously without contact with the liquid in either, said tank having a plurality of openings through which drinking may take place, a plurality of headers, one being arranged around each of said opening and carried by said tank, and resilient means attached to said headers for supporting said heating element within said tank, said heating element encircling said tapered bottom wall, the lowerpart of said container wall having an opening, a valve body disposed in said opening, a double acting valve in said valve body, a float operatively connected with said double acting valve to operate the same and adapted to sense the liquid level in said tank for operating said double acting valve, first and second gaskets encircling said opening on the upper and lower surfaces respectively, a flange projecting from said valve body and seated upon said first gasket, the portion of the valve body disposed through and below said opening being threaded, a nut threaded on said portion and in engagement with said second gasket, said valve having two valve heads which are adjustable toward and away from each other, a strainer enclosing the upper end of said valve body to assure that water passing into said tank will be free from large foreign particles, said container being in the form of a truncated cone, a band at the upper extremity thereof which seats against the inside surface of the upper end of said tank, a laterally projecting shoulder at the upper extremity of said band which seats upon the outer edge of the upper open end of said tank, said shoulder projecting laterally a sufficient distance for the outer peripheral surface of said container to be coplanar with the outer peripheral surface of said tank whereby said fountain has the appearance of being integral.

References Cited in the file of this patent

UNITED STATES PATENTS

| | | |
|---|---|---|
| 1,438,770 | Long | Dec. 12, 1922 |
| 2,490,824 | Meisner | Dec. 13, 1949 |
| 2,678,026 | Rue et al. | May 11, 1954 |

FOREIGN PATENTS

| | | |
|---|---|---|
| 327,340 | Great Britain | Apr. 3, 1930 |